(12) United States Patent
Manda

(10) Patent No.: US 12,712,175 B2
(45) Date of Patent: Aug. 18, 2026

(54) ELECTRODE FOIL WRINKLE REMOVER BAND

(71) Applicant: GM GLOBAL TECHNOLOGY OPERATIONS LLC, Detroit, MI (US)

(72) Inventor: Raghavendra Keerthi Manda, Northville, MI (US)

(73) Assignee: GM GLOBAL TECHNOLOGY OPERATIONS, Detroit, MI (US)

( * ) Notice: Subject to any disclaimer, the term of this patent is extended or adjusted under 35 U.S.C. 154(b) by 398 days.

(21) Appl. No.: 18/494,853

(22) Filed: Oct. 26, 2023

(65) Prior Publication Data

US 2025/0140781 A1 May 1, 2025

(51) Int. Cl.
*H01M 4/04* (2006.01)
*B30B 3/04* (2006.01)

(52) U.S. Cl.
CPC ............. *H01M 4/0435* (2013.01); *B30B 3/04* (2013.01)

(58) Field of Classification Search
CPC .. B30B 3/00; B30B 3/005; B30B 3/04; B30B 3/045; B30B 9/20; B30B 9/202; B30B 11/18; H01M 4/0435; H01M 4/139; Y02E 60/10; Y02P 70/50
See application file for complete search history.

(56) References Cited

FOREIGN PATENT DOCUMENTS

| | | | | | |
|---|---|---|---|---|---|
| CN | 103032518 B | * | 4/2016 | ............... | F16G 3/02 |
| CN | 110880580 A | * | 3/2020 | .......... | H01M 4/0435 |
| CN | 110890586 A | * | 3/2020 | ........ | H01M 10/0585 |
| DE | 102021202067 A1 | | 9/2022 | | |
| JP | 5390721 B1 | * | 1/2014 | ............... | B30B 3/00 |

OTHER PUBLICATIONS

English translation for DE-102021202067 A1—13 pages, retrieved in Jan. 2026. (Year: 2026).*
English translation for CN-103032518 B—11 pages, retrieved in Jan. 2026. (Year: 2026).*
English translation for CN-110890586 A—9 pages, retrieved in Jan. 2026. (Year: 2026).*
DE Office Action for Appln No. 10 2023 136 407.3 dated Jul. 23, 2024, 4 pages.

* cited by examiner

*Primary Examiner* — Jimmy T Nguyen
(74) *Attorney, Agent, or Firm* — CANTOR COLBURN LLP

(57) ABSTRACT

Aspects of the disclosure include an electrode calendering system having an electrode foil wrinkle remover band and a process for manufacturing electrodes using the same. An exemplary system includes a top roll press and a bottom roll press separated from the top roll press by a gap. The gap includes a distance selected to accommodate a current collector having a bare portion and a coated portion having thereon an active electrode material of a first thickness. The system further includes a wrinkle remover band having a second thickness selected, based on the first thickness, to evenly distribute stress across the bare portion and the coated portion of the current collector during a calendering process for forming a pressed electrode.

15 Claims, 6 Drawing Sheets

ELECTRODE FOIL WRINKLE REMOVER BAND

The present disclosure relates to battery cell manufacturing, and particularly to an electrode calendering system having an electrode foil wrinkle remover band.

Electrodes are widely used in a range of devices that store electrical energy, including primary (non-rechargeable) battery cells, secondary (rechargeable) battery cells, fuel cells, and capacitors. An ideal electrode needs to balance various electrical energy storage characteristics, such as, for example, energy density, power density, maximum charging rate, internal leakage current, equivalent series resistance (ESR), charge-discharge cycle durability, high electrical conductivity, and low tortuosity. Electrodes often incorporate current collectors to supplement or otherwise improve upon these electrical energy storage characteristics. Current collectors can be added to provide a higher specific conductance and can increase the available contact area to minimize the interfacial contact resistance between the electrode and its terminal.

A current collector is typically a sheet of conductive material to which the active electrode material is attached. Aluminum foil, aluminum alloy, copper alloy, stainless steel, and titanium foil are commonly used as the current collector of an electrode. In some electrode fabrication processes, for example, a film that includes activated carbon powder (i.e., the active electrode material) is attached to a thin aluminum or copper foil using an adhesive layer. To improve the quality of the interfacial bond between the film of active electrode material and the current collector, the combination of the film and the current collector is processed in a pressure laminator, for example, a calendar. This process is generally known as calendering. Thus, the fabrication of an electrode typically involves the production of an active electrode material film and the lamination of that film onto a current collector.

SUMMARY

In one exemplary embodiment an electrode calendering system having an electrode foil wrinkle remover band is provided for manufacturing electrodes. The system includes a top roll press and a bottom roll press separated from the top roll press by a gap. The gap includes a distance selected to accommodate a current collector having a bare portion and a coated portion having thereon an active electrode material of a first thickness. The system further includes a wrinkle remover band having a second thickness selected, based on the first thickness, to evenly distribute stress across the bare portion and the coated portion of the current collector during a calendering process for forming a pressed electrode.

In addition to one or more of the features described herein, in some embodiments, the system includes at least one of a band guide roll and a tensioning roll configured to align the wrinkle remover band with the bare portion of the current collector.

In some embodiments, the system includes a servo system coupled to at least one of the band guide roll and the tensioning roll. The servo system can include a servo motor and one or more rollers configured to reposition the wrinkle remover band to maintain alignment with the bare portion of the current collector.

In some embodiments, the wrinkle remover band is a top wrinkle remover band positioned over a top surface of the bare portion of the current collector. In some embodiments, the wrinkle remover band is a bottom wrinkle remover band positioned over a bottom surface of the bare portion of the current collector.

In some embodiments, the wrinkle remover band is one of a top wrinkle remover band positioned over a top surface of the bare portion of the current collector and a bottom wrinkle remover band positioned over a bottom surface of the bare portion of the current collector, and the system further includes a second wrinkle remover band that is the other of the top wrinkle remover band and the bottom wrinkle remover band.

In some embodiments, the second thickness of the wrinkle remover band is tapered.

In some embodiments, the wrinkle remover band is positioned over a top surface of the bare portion of the current collector and the second thickness of the wrinkle remover band includes a positive taper that increases towards an edge of the current collector.

In some embodiments, the wrinkle remover band is positioned over a bottom surface of the bare portion of the current collector and the second thickness of the wrinkle remover band includes a positive taper that increases towards an edge of the current collector.

In another exemplary embodiment a method is provided for manufacturing electrodes. The method includes providing a top roll press and providing a bottom roll press separated from the top roll press by a gap. The gap includes a distance selected to accommodate a current collector. The current collector includes a bare portion and a coated portion having thereon an active electrode material of a first thickness. The method includes providing a wrinkle remover band having a second thickness selected, based on the first thickness, to evenly distribute stress across the bare portion and the coated portion of the current collector during a calendering process for forming a pressed electrode.

In some embodiments, the method includes providing at least one of a band guide roll and a tensioning roll configured to align the wrinkle remover band with the bare portion of the current collector.

In some embodiments, the method includes providing a servo system coupled to at least one of the band guide roll and the tensioning roll. The servo system includes a servo motor and one or more rollers configured to reposition the wrinkle remover band to maintain alignment with the bare portion of the current collector.

In some embodiments, the wrinkle remover band includes a top wrinkle remover band positioned over a top surface of the bare portion of the current collector.

In some embodiments, the wrinkle remover band includes a bottom wrinkle remover band positioned over a bottom surface of the bare portion of the current collector.

In some embodiments, the wrinkle remover band includes one of a top wrinkle remover band positioned over a top surface of the bare portion of the current collector and a bottom wrinkle remover band positioned over a bottom surface of the bare portion of the current collector. In some embodiments, the method further includes providing a second wrinkle remover band that is the other of the top wrinkle remover band and the bottom wrinkle remover band.

In some embodiments, the second thickness of the wrinkle remover band is tapered.

In some embodiments, the wrinkle remover band is positioned over a top surface of the bare portion of the current collector and the second thickness of the wrinkle remover band includes a positive taper that increases towards an edge of the current collector.

In some embodiments, the wrinkle remover band is positioned over a bottom surface of the bare portion of the current collector and the second thickness of the wrinkle remover band includes a positive taper that increases towards an edge of the current collector.

In some embodiments, the wrinkle remover band is configured as multiple separate bands positioned across the bare portion of the current collector for lane coating applications.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings.

DETAILED DESCRIPTION

Figure 1:
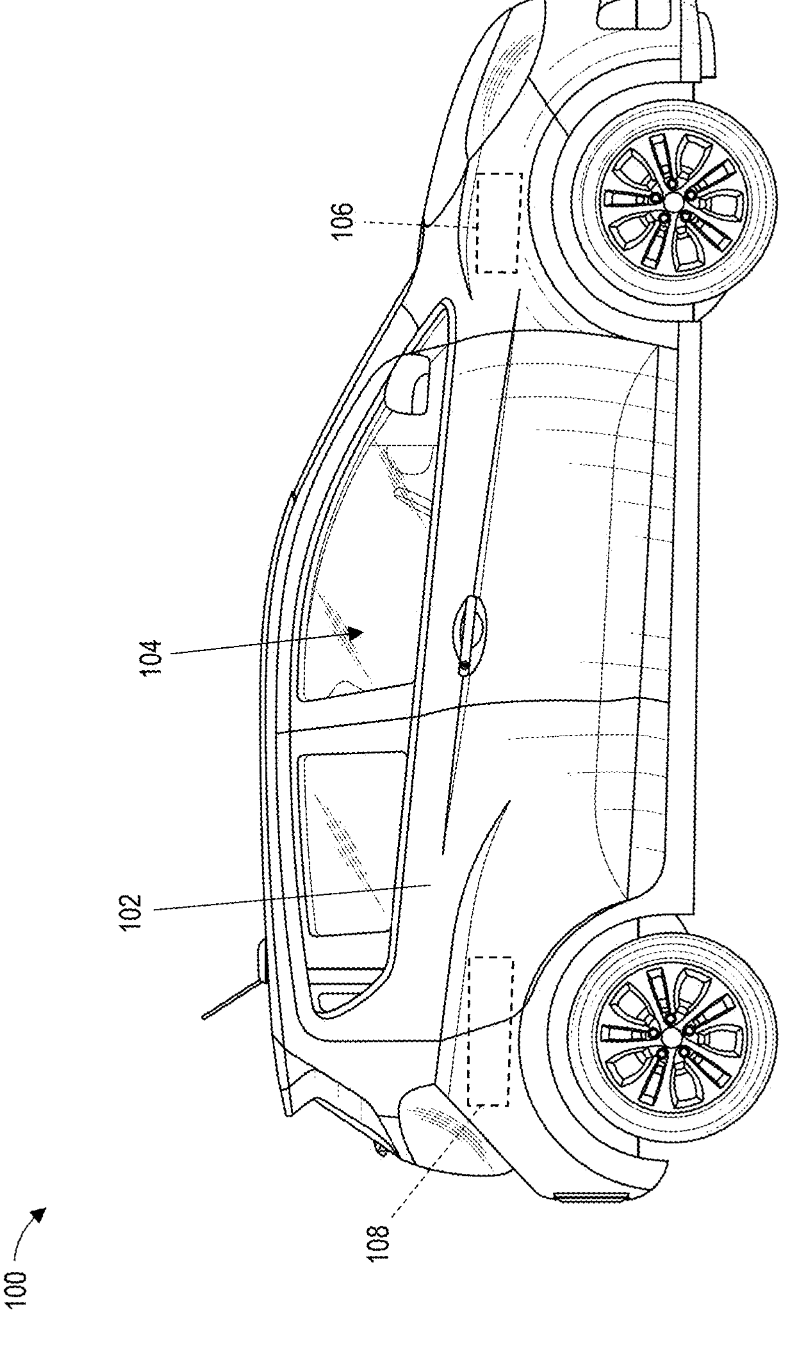
FIG. 1 is a vehicle configured in accordance with one or more embodiments.

The following description is merely exemplary in nature and is not intended to limit the present disclosure, its application or uses. It should be understood that throughout the drawings, corresponding reference numerals indicate like or corresponding parts and features.

Electrodes often incorporate current collectors to supplement or otherwise improve upon the electrical energy storage characteristics of the final integrated device (e.g., a battery). A current collector typically includes a sheet of conductive material (e.g., aluminum foil, copper foil, etc.) to which an active electrode material is attached. To improve the quality of the interfacial bond between the film of the active electrode material and the current collector, the combination of the film and the current collector is processed in a pressure laminator. Thus, the fabrication of an electrode typically involves the production of an active electrode material film and the lamination of that film onto a current collector (the so-called calendering process).

Calendering can be generally defined as the compression of a dried electrode (the latter typically resulting from the coating and drying of an electrode slurry) to reduce its porosity, improve particle contact, and enhance energy or power density. Conventional calendering processes have been used to improve various aspects of battery technology by offering, for example, a higher specific conductance, greater contact areas, and lower contact resistance in the electrode. There are several challenges, however, in optimizing the calendering process.

One such challenge, for example, is that the calendering of electrodes (e.g., cathodes) onto current collector substrates (e.g., foil substrates such as aluminum, stainless steel, and titanium) produces a wrinkling defect when targeting lower porosities. Wrinkling defects (also referred to as uneven elongation) are found at the interface between the coated sections of the current collector (i.e., those portions having pressed electrode films) and the uncoated sections (i.e., bare sections of the current collector) and are caused due to the different material properties and thicknesses of the electrode and substrate materials. These defects worsen as the resultant porosity decreases, meaning that relatively lower porosity electrodes natively suffer from more pervasive wrinkling defects.

While there are several approaches to mitigating wrinkling defects, each comes with of some tradeoff. For example, the naïve approach is to raise the porosity target, resulting in a proportional reduction in wrinkling defects but with decreased electrode conductivity. Another approach is to fully cover the substrate, so that there is no interface at which wrinkle defects can occur. The trade off here is that bare foil sections of the current collector (i.e., those portions not covered with the active electrode material) are ideal for use as battery terminals, and simply removing the bare foil sections reduces battery efficiencies.

This disclosure introduces a new electrode calendering system having an electrode foil wrinkle remover band and a process for manufacturing electrodes using the same. Rather than raising porosity targets or removing (or reducing) the bare foil portions of an electrode, an electrode calendering system described herein leverages the electrode foil wrinkle remover band to evenly distribute stress during the calendering process. In some embodiments, the wrinkle remover band is positioned over the bare foil portion of the current collector at the interface with the coated portion to transfer compressive forces from the calendar rolls onto the bare foil, maintaining equal compression with the coated portions. Maintaining equal compression during the calendering process reduces (or eliminates entirely) wrinkling defects and results in an even elongation across all sections of the pressed electrode. In some embodiments, the wrinkle remover band is positioned over the current collector using a system of tensioning rolls to improve alignment. In some embodiments, the wrinkle remover band is actively guided (positioned and re-positioned) onto the current collector using a servo system that tracks the positioned of the wrinkle remover band and/or the current collector to improve alignment.

Leveraging an electrode calendering system having a wrinkle removal band configured in accordance with one or more embodiments offers several technical advantages over prior designs. Notably, the modified manufacturing system and associated process described herein can be used to produce electrodes without (or with greatly reduced) wrinkling defects and relatively improved elongation. Batteries built from electrodes without wrinkles and with a more even elongation deliver a range of improved battery characteristics, as these defects can reduce electrode integrity (e.g., wrinkles can lead to poor adhesion between the coated electrode film and the current collector, resulting in regions of relatively weak attachment that are prone to delamination or peeling), increase electrical resistance (wrinkles and thickness variations can create gaps or areas of reduced contact between the electrode material and the current collector that can impede the flow of electrons), increase degradation and reduce cycle life (electrodes with wrinkles and/or uneven elongation can experience increased stress and strain during charge-discharge cycles due to inconsistent mechanical properties, which can lead to accelerated degradation, cracking, or even electrode failure), increase thermal instabilities (wrinkles can trap electrolytes and inhibit heat dissipation, resulting in localized hotspots that can degrade the electrolyte), and reduce capacity and energy density (wrinkling and elongation defects can lead to uneven thickness distributions across the electrode surface and these non-uniformities can result in reduced active material utilization, lower capacity, and compromised energy density in the battery). Other advantages are possible. For example, while a roll press can be constructed de novo to incorporate support material application and removal, aspects of the present disclosure can be leveraged to modify existing roll presses to reduce wrinkle defects by adding a wrinkle remover band and a few positioning and tensioning rolls without main roll/calendering roll redesigns. Finally, reducing wrinkle and elongation defects using a wrinkle removal band as described herein obviates the need for foil annealing and foil rigidity steps as well as the need to introduce ridges in the current collector, each of which are techniques typically relied upon for defect mitigation but are known to weaken the foil. In addition, annealing and foil rigidity steps are energy-intensive and expensive.

A vehicle, in accordance with an exemplary embodiment, is indicated generally at 100 in FIG. 1. Vehicle 100 is shown in the form of an automobile having a body 102. Body 102 includes a passenger compartment 104 within which are arranged a steering wheel, front seats, and rear passenger seats (not separately indicated). Within the body 102 are arranged a number of components, including, for example, an electric motor 106 (shown by projection under the front hood). The electric motor 106 is shown for ease of illustration and discussion only. It should be understood that the configuration, location, size, arrangement, etc., of the electric motor 106 is not meant to be particularly limited, and all such configurations (including multi-motor configurations) are within the contemplated scope of this disclosure.

The electric motor 106 is powered via a battery pack 108 (shown by projection near the rear of the vehicle 100). The battery pack 108 is shown for ease of illustration and discussion only. It should be understood that the configuration, location, size, arrangement, etc., of the battery pack 108 is not meant to be particularly limited, and all such configurations (including split configurations) are within the contemplated scope of this disclosure. Moreover, while the present disclosure is discussed primarily in the context of a battery pack 108 configured for the electric motor 106 of the vehicle 100, aspects described herein can be similarly incorporated within any system (vehicle, building, or otherwise) having an energy storage system(s) (e.g., one or more battery packs or modules), and all such configurations and applications are within the contemplated scope of this disclosure.

As will be detailed herein, the battery pack 108 includes one or more cells having electrodes with enhanced edge quality (that is, even elongation and reduced or eliminated wrinkles). In some embodiments, an electrode calendering system is modified to include a wrinkle remover band (refer to FIGS. 2 and 3A). In some embodiments, the wrinkle remover band is actively positioned using a servo system (refer to FIG. 3B). In some embodiments, the wrinkle remover band is positioned over both surfaces (top and bottom) of the current collector (refer to FIG. 4A). In some embodiments, the wrinkle remover band is positioned over one of the surfaces (top or bottom) of the current collector (refer to FIGS. 4B and 4C). In some embodiments, the wrinkle remover band is configured as multiple bands positioned across the bare foil portions of a current collector for lane coating applications (refer to FIG. 5A). In some embodiments, the wrinkle remover band is positioned over one of the surfaces (top or bottom) of the current collector for a single coating (refer to FIGS. 5B and 5C).

Figure 2:
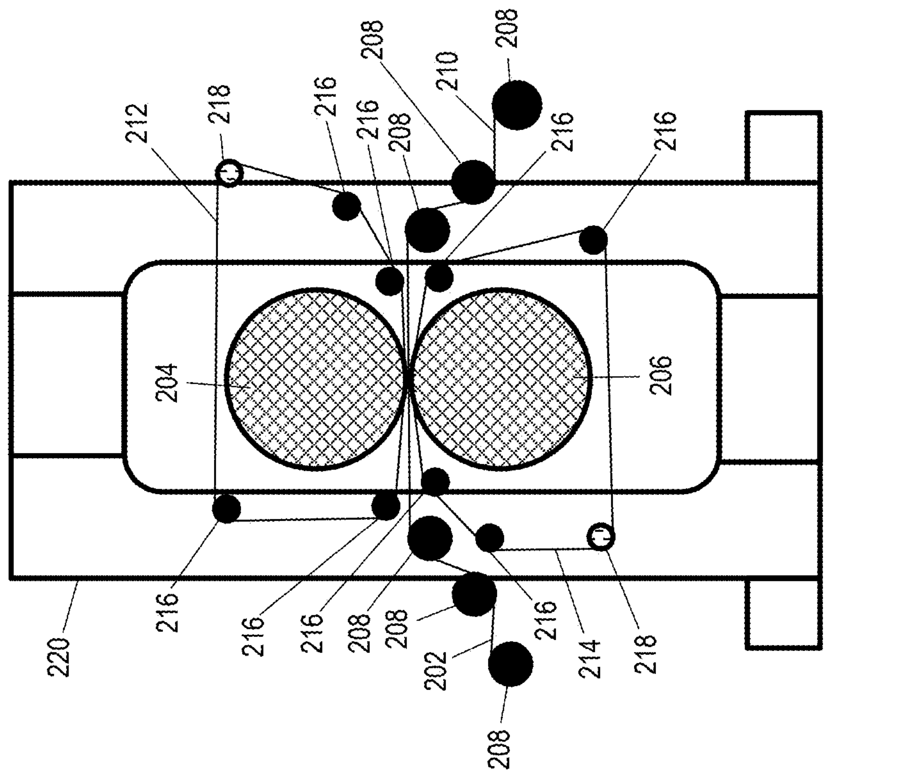
FIG. 2 is an example configuration of an electrode calendering system in accordance with one or more embodiments.

FIG. 2 illustrates an example configuration of an electrode calendering system 200 in accordance with one or more embodiments. As shown in FIG. 2, the electrode calendering system 200 can include a coated current collector 202 which is passed between a top roll press 204 and a bottom roll press 206 for calendering. In some embodiments, the coated current collector 202 (also referred to as the coated web) is passed through the top roll press 204 and the bottom roll press 206 using a series of guide rolls 208. In some embodiments, the coated current collector 202 is wound into a coated electrode roll following a coating process (not separately shown). In some embodiments, the coated current collector 202 is unwound from the coated electrode roll and coupled to the guide rolls 208 for calendering. After calendering (e.g., after passing between the top roll press 204 and the bottom roll press 206), the coated current collector 202 can be referred to as a pressed electrode 210.

In some embodiments, the coated current collector 202 includes a current collector coated with an active electrode material. While not meant to be particularly limited, the active electrode material can include, for example, various cathode or anode materials (depending on the requirements of a specific application), such as, for example, activated carbon powder, nickel manganese cobalt oxide (NMC), lithium iron phosphate (LFP), nickel cobalt aluminum oxide (NCA), nickel cobalt manganese aluminum oxide (NCMA), lithium manganese iron phosphate (LMFP), lithium manganese rich (LMR), lithium manganese oxide (LMO), graphite, silicon, silicon-graphite composites, tin, tin oxide ($SnO_2$), lithium titanate ($Li_4Ti_5O_{12}$, LTO), sulfur and lithium-sulfur (Li—S) composites, lithium metal (Li), and/or lithium alloys such as lithium-antimony (Li—Sb), lithium-aluminum (Li—Al), and lithium-germanium (Li—Ge), and the like.

Similarly, the current collector (also referred to as the web or bare foil) is not meant to be particularly limited, but can include, for example, a sheet of conductive metal such as aluminum foil, stainless steel, and titanium foil. Other materials are possible, such as, for example, semimetals (e.g., tin, graphite), alloys of the metals and/or semimetals, conductive 2-dimensional wire mesh, conductive 3-dimensional wire mesh, conductive foam, and the like.

In some embodiments, the top roll press 204 and the bottom roll press 206 are positioned to apply pressure onto the coated current collector 202. This process, known as calendering, is designed to improve the density, uniformity, and overall performance of the resulting pressed electrode 210 by compressing and compacting an electrode material onto a portion of a current collector. The top roll press 204 and the bottom roll press 206 can be made of a durable material, such as steel, and can be manufactured with precision surfaces (e.g., sub 10 micron tolerances) to ensure uniform pressure distribution. In some embodiments, the top roll press 204 is positioned vertically above the bottom roll press 206 and a gap (not separately shown) can be adjusted by moving (e.g., hydraulically) one or both of the top roll press 204 and the bottom roll press 206 to control the amount of pressure applied.

In some embodiments, the electrode calendering system 200 includes several control parameters, such as, for example, a roll temperature (top and/or bottom), a calendering pressure, a gap distance, and a line speed. In some embodiments, the roll temperature is up to 150 degrees Celsius, the pressure is up to 10 Mpa, and the line speed is 110 meters per minute, although other calendering configurations are within the contemplated scope of this disclosure. In some embodiments, the gap between the top roll press 204 and the bottom roll press 206 can be adjusted (hydraulically or otherwise) to the desired thickness of the pressed electrode 210.

As the top roll press 204 and/or the bottom roll press 206 applies pressure, the coated current collector 202 is compressed. This helps improve the density of the pressed electrode 210, removes voids and air pockets, and enhances the contact between the active electrode material and the current collector. The calendering process also results in a reduction in the thickness of the coated current collector 202, as the pressed electrode 210 is flattened under the pressure of the rollers.

In some embodiments, the electrode calendering system 200 includes a top wrinkle remover band 212 and/or a bottom wrinkle remover band 214. In some embodiments, the presence of the top wrinkle remover band 212 and/or the bottom wrinkle remover band 214 ensures that the stress applied to the bare foil portions of the coated current collector 202 is the same as the stress applied to the coated portions of the coated current collector 202.

In some embodiments, a thickness of the top wrinkle remover band 212 and/or the bottom wrinkle remover band 214 for a given application is selected to ensure the equal distribution of stresses. Observe that the thickness required to achieve a uniform stress distribution will vary based on the loading (e.g., milligrams per centimeter squared) and density of the electrode material, the material selected for the current collector, and the target thickness of the pressed electrode 210. Moreover, band thickness can be selected based on any of a number of design and/or target parameters, such as flexural strength, strain, elongation, thickness of the electrode, and/or yield strength. The band thickness can also vary based on additional factors including, but not limited to, electrode formulation, surface roughness, tensile properties, and the like.

The top wrinkle remover band 212 and/or the bottom wrinkle remover band 214 can be made of a material having a known elasticity under the design calendering pressures. For example, while not meant to be particularly limited, the top wrinkle remover band 212 and/or the bottom wrinkle remover band 214 can be made of silicon mixed with a polymer such as polypropene, thermoplastic polymers such as polyethylene terephthalate (PET) and polyvinylidene fluoride (PVDF), polyethylene (PE), including low-density polyethylene (LDPE) and high-density polyethylene (HDPE), polytetrafluoroethylene (PTFE), polyamides such as nylon, synthetic rubbers such as neoprene, hybrid materials with glass fibers, silicon oxide, etc., polymers and metal laminates with rubber, and the like. In some embodiments, the top wrinkle remover band 212 and/or the bottom wrinkle remover band 214 can be made of a highly elastic material to minimize tool wear and allow for continuous calendering operation over several cycles. As used herein, a "highly elastic" material refers to a material having a Young's modulus less than 3 gigapascals (GPa), In some embodiments, the highly elastic material has a Young's modulus of less than 1 GPa, such as rubber (around 0.01 to 0.1 GPa). In some embodiments, the highly elastic material has a Young's modulus of less than 0.1 GPa, such as an elastomer (around 0.001 to 0.1 GPa).

In some embodiments, the top wrinkle remover band 212 and/or the bottom wrinkle remover band 214 are passed through the top roll press 204 and the bottom roll press 206 using a series of band guide rolls 216, in a similar manner as described previously with respect to the coated current collector 202 and the guide rolls 208. In some embodiments, the top wrinkle remover band 212 and the bottom wrinkle remover band 214 are passed through the top roll press 204 and the bottom roll press 206 using separate band guide rolls 216 (as shown), although other configurations having shared band guide rolls 216 are within the contemplated scope of this disclosure.

In some embodiments, the electrode coating system 200 includes one or more tensioning rolls 218 coupled to the top wrinkle remover band 212 and/or the bottom wrinkle remover band 214 and configured to maintain a consistent and controlled tension as the top wrinkle remover band 212 and/or the bottom wrinkle remover band 214 pass through the calendering process. In some embodiments, each collection of separate band guide rolls 216 includes one or more tensioning rolls 218 (as shown).

In some embodiments, the electrode coating system 200 includes a support structure 220 for the top roll press 204, the bottom roll press 206, the guide rolls 208, the band guide rolls 216, and/or the tensioning rolls 218. The support structure 220 can include, for example, a steel frame, although other materials are within the contemplated scope of this disclosure.

Figures 3A, 3B:
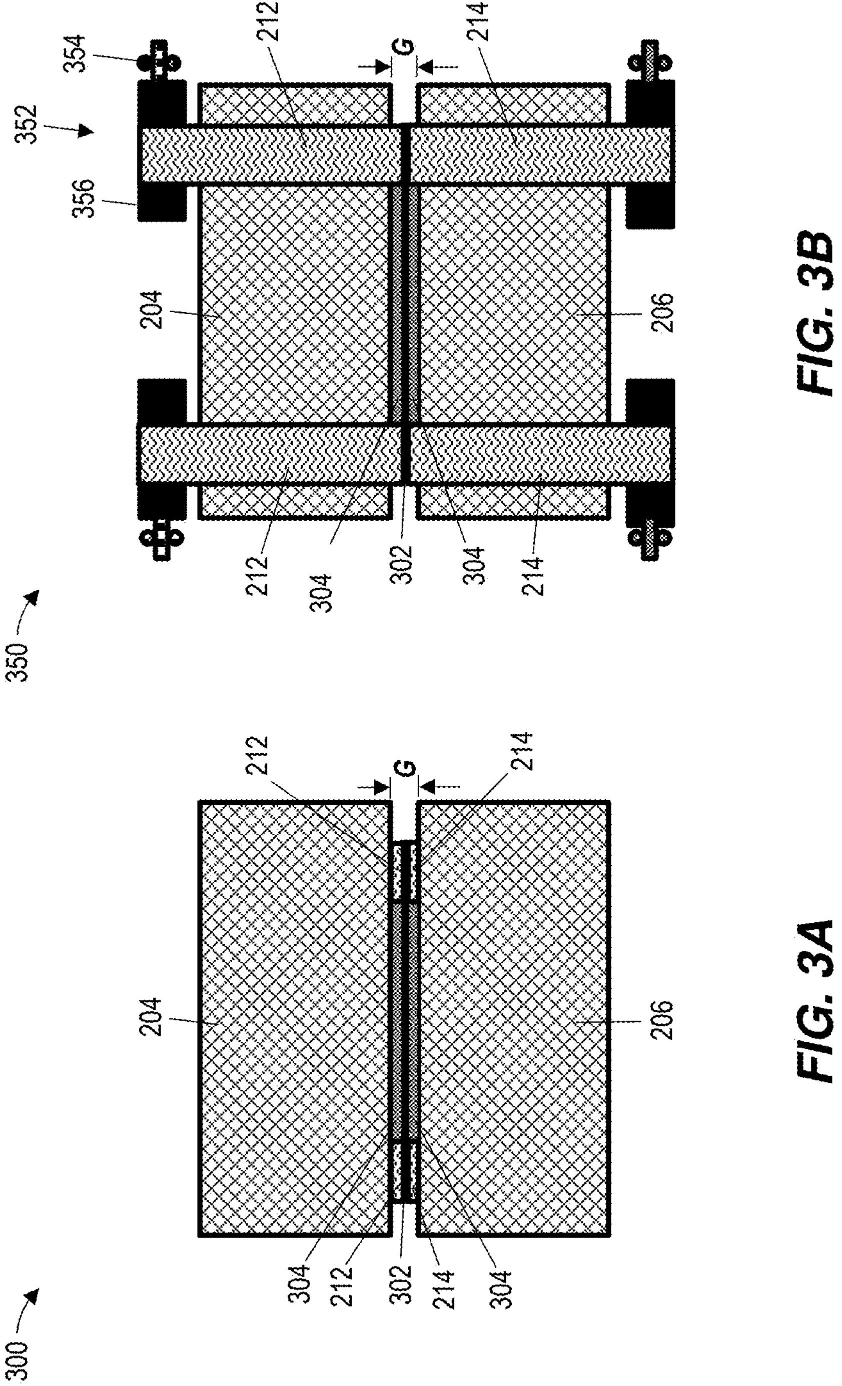
FIG. 3A is a view of an electrode calendering system in accordance with one or more embodiments.
FIG. 3B is a view of an alternative electrode calendering system in accordance with one or more embodiments.

FIG. 3A illustrates a view of an electrode calendering system 300 in accordance with one or more embodiments. In some embodiments, the electrode calendering system 300 is a portion of a calendering system (e.g., the electrode calendering system 200 in FIG. 2). As shown in FIG. 3A, the electrode calendering system 300 can include the top roll press 204, the bottom roll press 206, the top wrinkle remover band 212, and the bottom wrinkle remover band 214, configured and arranged as shown.

In some embodiments, a current collector 302 is coated with an active electrode material 304 and passed between the top roll press 204 and the bottom roll press 206 for calendering. In some embodiments, both surfaces (for example, top and bottom) of the current collector 302 are coated with the active electrode material 304 (as shown). Alternatively, a single surface (for example, top or bottom) of the current collector 302 can be coated with the active electrode material 304 (refer to FIGS. 5B and 5C). The current collector 302 and the active electrode material 304 coated thereon collectively define a coated current collector, such as the coated current collector 202 described with respect to FIG. 2.

In some embodiments, the top wrinkle remover band 212 and the bottom wrinkle remover band 214 can be designed to have a thickness that mimics the coating thickness of the active electrode material 304 pressed onto the current collector 302. For example, the top roll press 204 and the bottom roll press 206 can be separated by a gap G and the top wrinkle remover band 212 and the bottom wrinkle remover band 214 can each have a thickness selected, based off a thickness of the bare portions of the current collector 302, to ensure that the gap G is filled (as shown). In this manner, the thickness delta between the coated and uncoated portions of the current collector 302 is greatly minimized (if not removed entirely), lowering wrinkling defects and providing an even elongation without sacrificing porosity targets and/or bare foil surface area. Consequently, the top wrinkle remover band 212 and the bottom wrinkle remover band 214 serve to more evenly distribute calendering stresses during the calendering process, resulting in improved edge quality in the resultant, pressed electrode (e.g., the pressed electrode 210).

FIG. 3B illustrates a view of an alternative electrode calendering system 350 in accordance with one or more embodiments. In some embodiments, the electrode calendering system 350 is a portion of a calendering system (e.g., the electrode calendering system 200 in FIG. 2). As shown in FIG. 3B, the electrode calendering system 350 can include the top roll press 204, the bottom roll press 206, the top wrinkle remover band 212, and the bottom wrinkle remover band 214, configured and arranged as shown.

In some embodiments, a current collector 302 is coated with an active electrode material 304 and passed between the top roll press 204 and the bottom roll press 206 for calendering. In some embodiments, both surfaces (for example, top and bottom) of the current collector 302 are coated with the active electrode material 304 (as shown). Alternatively, a single surface (for example, top or bottom) of the current collector 302 can be coated with the active electrode material 304 (refer to FIGS. 5B and 5C). The current collector 302 and the active electrode material 304 coated thereon collectively define a coated current collector, such as the coated current collector 202 described with respect to FIG. 2.

In some embodiments, the top wrinkle remover band 212 and the bottom wrinkle remover band 214 can be designed to have a thickness that mimics the coating thickness of the active electrode material 304 pressed onto the current collector 302, as described previously with respect to FIG. 3A. For example, the top roll press 204 and the bottom roll press 206 can be separated by a gap G and the top wrinkle remover band 212 and the bottom wrinkle remover band 214 can each have a thickness selected, based off a thickness of the bare portions of the current collector 302, to ensure that the gap G is filled (as shown). In this manner, the thickness delta between the coated and uncoated portions of the current collector 302 is greatly minimized (if not removed entirely), lowering wrinkling defects and providing an even elongation without sacrificing porosity targets and/or bare foil surface area. Consequently, the top wrinkle remover band 212 and the bottom wrinkle remover band 214 serve to more evenly distribute calendering stresses during the calendering process, resulting in improved edge quality in the resultant, pressed electrode (e.g., the pressed electrode 210).

In some embodiments, the electrode calendering system 350 includes one or more servo systems 352 to actively position the top wrinkle remover band 212 and the bottom wrinkle remover band 214 with respect to the current collector 302 and/or the active electrode material 304. In some embodiments, the servo systems 352 can be configured to ensure (or improve within tooling limits) alignment between two or more of the top wrinkle remover band 212, the bottom wrinkle remover band 214, the current collector 302, and the active electrode material 304.

In some embodiments, each of the servo systems 352 includes a servo motor 354 and one or more rollers 356. The servo motor 354 is responsible for driving and/or repositioning the rollers 356 and/or other guiding mechanisms (not separately shown) as needed to position the top wrinkle remover band 212 and/or the bottom wrinkle remover band 214 accurately. While not meant to be particularly limited, the servo motor 354 can include a high torque motor having a torque rating of around 10 Newton-meters, speed control, and precise positioning capabilities. The servo systems 352 can include one or more sensors (not separately shown) coupled to the servo motor 354 and/or the rollers 356. The sensors can include, for example, position sensors (e.g., optical encoders or linear position sensors) that continuously and/or periodically monitor the position of the top wrinkle remover band 212, the bottom wrinkle remover band 214, the current collector 302, and/or the active electrode material 304 and tension sensors configured to measure the tension in the top wrinkle remover band 212, the bottom wrinkle remover band 214, and/or the current collector 302. In some embodiments, the servo systems 352 can include control electronics (not separately shown), such as a microcontroller and/or a dedicated servo controller to process feedback from the sensors and to generate control signals for the servo motor.

Figures 4A, 4B, 4C:
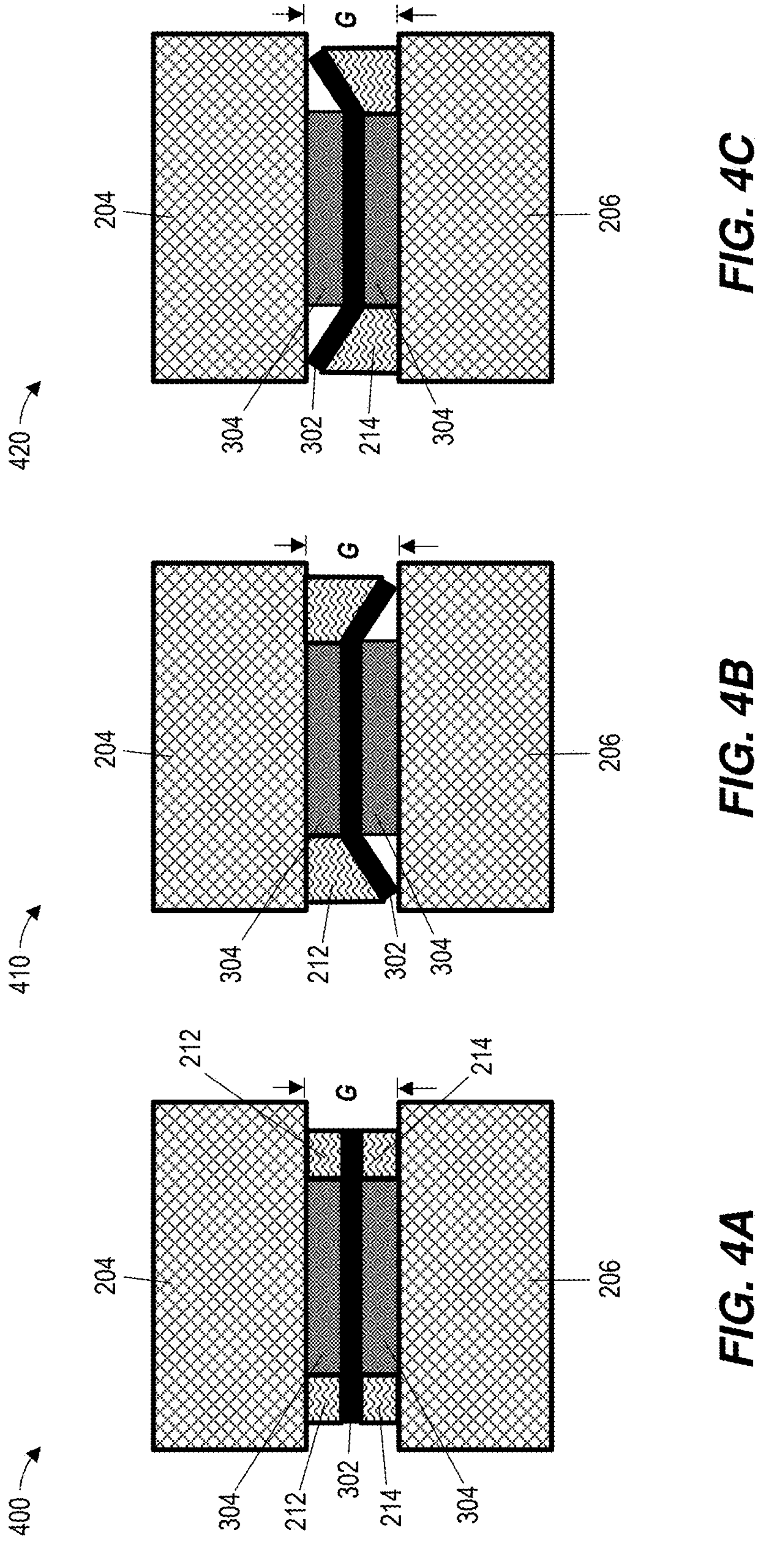
FIG. 4A is a view of an alternative electrode calendering system in accordance with one or more embodiments.
FIG. 4B is a view of an alternative electrode calendering system in accordance with one or more embodiments.
FIG. 4C is a view of an alternative electrode calendering system in accordance with one or more embodiments.

FIG. 4A illustrates a view of an alternative electrode calendering system 400 in accordance with one or more embodiments. In some embodiments, the electrode calendering system 400 is a portion of a calendering system (e.g., the electrode calendering system 200 in FIG. 2). As shown in FIG. 4A, the electrode calendering system 400 can include the top roll press 204, the bottom roll press 206, the top wrinkle remover band 212, and the bottom wrinkle remover band 214, configured and arranged as shown. FIG. 4A depicts a two-band configuration having both the top wrinkle remover band 212 and the bottom wrinkle remover band 214.

FIG. 4B illustrates a view of an alternative electrode calendering system 410 in accordance with one or more embodiments. In some embodiments, the electrode calendering system 410 is a portion of a calendering system (e.g., the electrode calendering system 200 in FIG. 2). As shown in FIG. 4B, the electrode calendering system 410 can include the top roll press 204, the bottom roll press 206, and the top wrinkle remover band 212, configured and arranged as shown. FIG. 4B depicts a one-band configuration having only the top wrinkle remover band 212.

As shown in FIG. 4B, the top wrinkle remover band 212 can have a tapered profile (as shown, a positive taper increasing towards an edge of the current collector 302). In some embodiments, the shape, thickness, slope, and/or taper of the top wrinkle remover band 212 is varied to distribute stress equally over bare foil and coated portions of the current collector 302. The specific taper shown in FIG. 4B is for ease of illustration and discussion only. The top wrinkle remover band 212 can have a tapered profile having a positive slope and/or a negative slope. The degree of slope shown in FIG. 4B is not meant to be particularly limited. Other tapering profiles are possible, including linear and nonlinear profiles, and all such configurations are within the contemplated scope of this disclosure. For example, the top wrinkle remover band 212 can have spherical, curved, sharp, square, triangular, and/or patterned taper profile as desired.

FIG. 4C illustrates a view of an alternative electrode calendering system 420 in accordance with one or more embodiments. In some embodiments, the electrode calendering system 420 is a portion of a calendering system (e.g., the electrode calendering system 200 in FIG. 2). As shown in FIG. 4C, the electrode calendering system 420 can include the top roll press 204, the bottom roll press 206, and the bottom wrinkle remover band 214, configured and arranged as shown. FIG. 4C depicts a one-band configuration having only the bottom wrinkle remover band 214.

As shown in FIG. 4C, the bottom wrinkle remover band 214 can have a tapered profile (as shown, a positive taper increasing towards an edge of the current collector 302). In some embodiments, the shape, thickness, slope, and/or taper of the bottom wrinkle remover band 214 is varied to distribute stress equally over bare foil and coated portions of the current collector 302. The specific taper shown in FIG. 4C is for ease of illustration and discussion only. The bottom wrinkle remover band 214 can have a tapered profile having a positive slope and/or a negative slope. The degree of slope shown in FIG. 4C is not meant to be particularly limited. Other tapering profiles are possible, including linear and nonlinear profiles, and all such configurations are within the contemplated scope of this disclosure. For example, the bottom wrinkle remover band 214 can have spherical, curved, sharp, square, triangular, and/or patterned taper profile as desired.

Figures 5A, 5B, 5C:
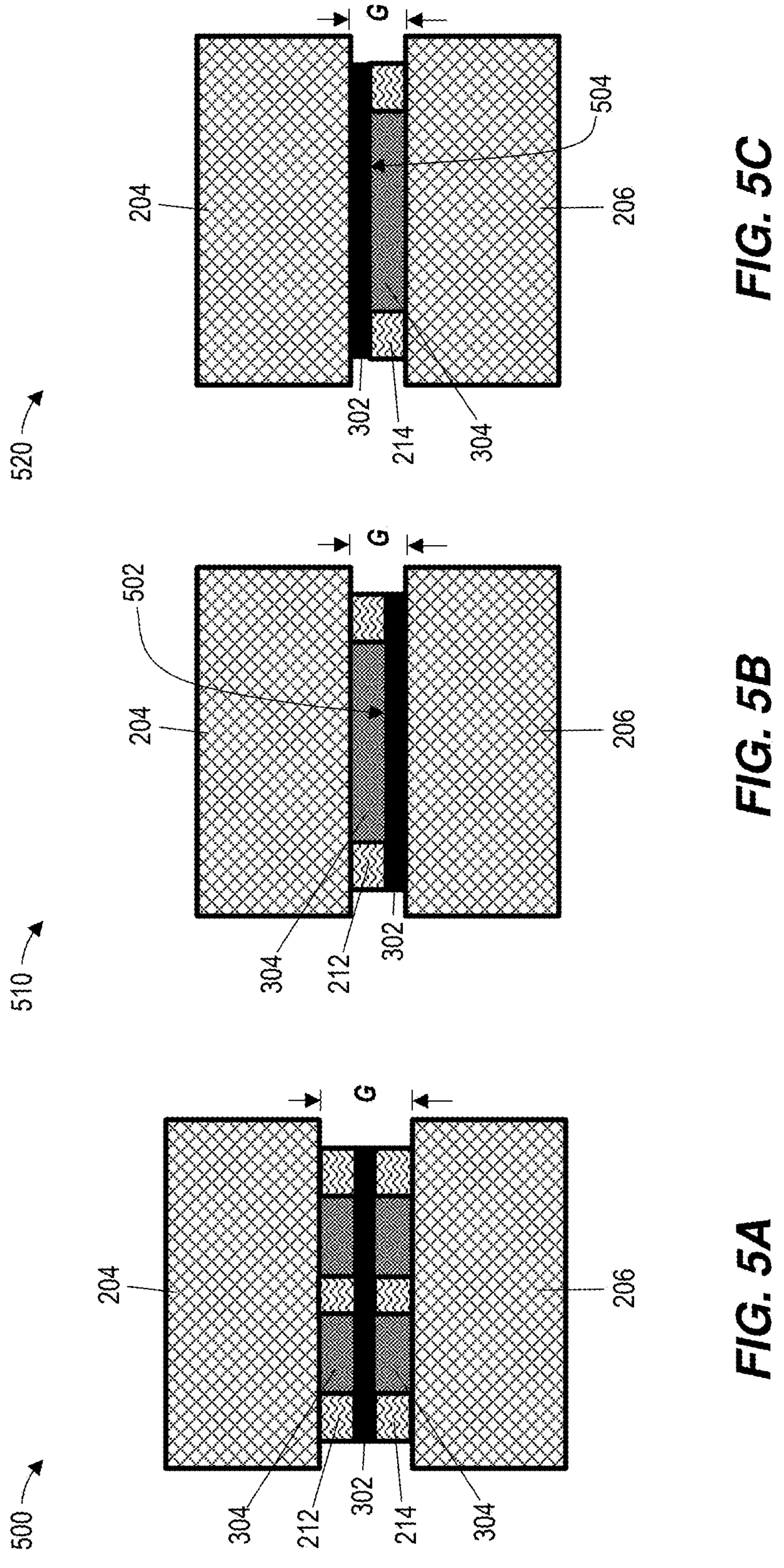
FIG. 5A is a view of an alternative electrode calendering system in accordance with one or more embodiments.
FIG. 5B is a view of an alternative electrode calendering system in accordance with one or more embodiments.
FIG. 5C is a view of an alternative electrode calendering system in accordance with one or more embodiments.

FIG. 5A illustrates a view of an alternative electrode calendering system 500 in accordance with one or more embodiments. In some embodiments, the electrode calendering system 500 is a portion of a calendering system (e.g., the electrode calendering system 200 in FIG. 2). As shown in FIG. 5A, the electrode calendering system 500 can include the top roll press 204, the bottom roll press 206, the top wrinkle remover band 212, and the bottom wrinkle remover band 214, configured and arranged as shown. FIG. 5A depicts a multi-band configuration where each of the top wrinkle remover band 212 and the bottom wrinkle remover band 214 are split into two or more bands over their respective surfaces of the current collector 302.

FIG. 5B illustrates a view of an alternative electrode calendering system 510 in accordance with one or more embodiments. In some embodiments, the electrode calendering system 510 is a portion of a calendering system (e.g., the electrode calendering system 200 in FIG. 2). As shown in FIG. 5B, the electrode calendering system 510 can include the top roll press 204, the bottom roll press 206, and the top wrinkle remover band 212, configured and arranged as shown. FIG. 5B depicts a one-band configuration having only the top wrinkle remover band 212, as the active electrode material 304 is only coated over a top surface 502 of the current collector 302 (e.g., a single coating process).

FIG. 5C illustrates a view of an alternative electrode calendering system 520 in accordance with one or more embodiments. In some embodiments, the electrode calendering system 520 is a portion of a calendering system (e.g., the electrode calendering system 200 in FIG. 2). As shown in FIG. 5C, the electrode calendering system 520 can include the top roll press 204, the bottom roll press 206, and the bottom wrinkle remover band 214, configured and arranged as shown. FIG. 5C depicts a one-band configuration having only the bottom wrinkle remover band 214, as the active electrode material 304 is only coated over a bottom surface 504 of the current collector 302 (e.g., a single coating process).

Figure 6:
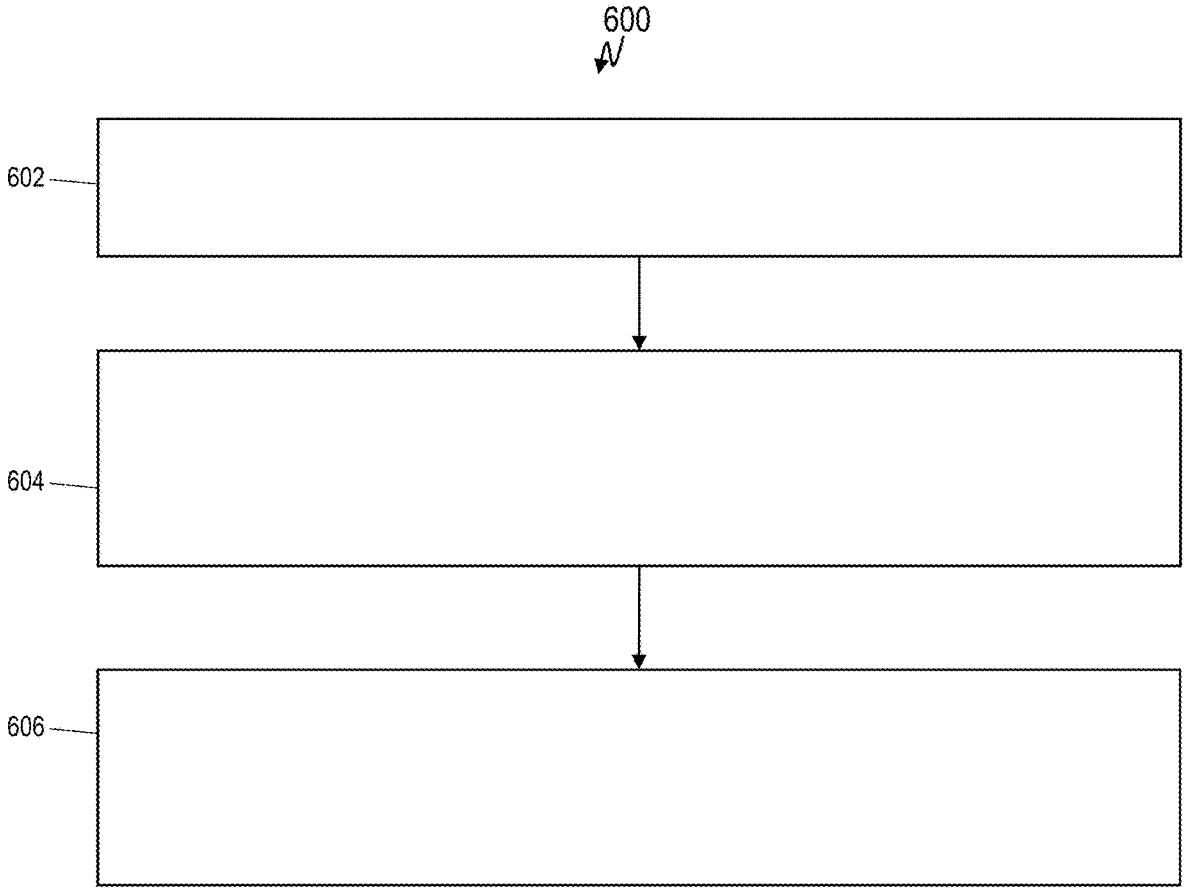
FIG. 6 is a flowchart in accordance with one or more embodiments.

Referring now to FIG. 6, a flowchart 600 for manufacturing electrodes using an electrode calendering system having an electrode foil wrinkle remover band is generally shown according to an embodiment. The flowchart 600 is described in reference to FIGS. 1-5C and may include additional steps not depicted in FIG. 6. Although depicted in a particular order, the blocks depicted in FIG. 6 can be rearranged, subdivided, and/or combined.

At block 602, the method includes providing a top roll press.

At block 604, the method includes providing a bottom roll press separated from the top roll press by a gap. In some embodiments, the gap includes a distance selected to accommodate a current collector. In some embodiments, the current collector includes a bare portion and a coated portion having thereon an active electrode material of a first thickness.

At block 606, the method includes providing a wrinkle remover band having a second thickness selected, based on the first thickness, to evenly distribute stress across the bare portion and the coated portion of the current collector during a calendering process for forming a pressed electrode.

In some embodiments, the method includes providing at least one of a band guide roll and a tensioning roll configured to align the wrinkle remover band with the bare portion of the current collector.

In some embodiments, the method includes providing a servo system coupled to at least one of the band guide roll and the tensioning roll. The servo system can include a servo motor and one or more rollers configured to reposition the wrinkle remover band to maintain alignment with the bare portion of the current collector.

In some embodiments, the wrinkle remover band is a top wrinkle remover band positioned over a top surface of the bare portion of the current collector.

In some embodiments, the wrinkle remover band is a bottom wrinkle remover band positioned over a bottom surface of the bare portion of the current collector.

In some embodiments, the wrinkle remover band is one of a top wrinkle remover band positioned over a top surface of the bare portion of the current collector and a bottom wrinkle remover band positioned over a bottom surface of the bare portion of the current collector. In some embodiments, the method further includes providing a second wrinkle remover band that is the other of the top wrinkle remover band and the bottom wrinkle remover band.

In some embodiments, the second thickness of the wrinkle remover band is tapered.

In some embodiments, the wrinkle remover band is positioned over a top surface of the bare portion of the current collector and the second thickness of the wrinkle remover band has a positive taper that increases towards an edge of the current collector.

In some embodiments, the wrinkle remover band is positioned over a bottom surface of the bare portion of the current collector and the second thickness of the wrinkle remover band is a positive taper that increases towards an edge of the current collector.

In some embodiments, the wrinkle remover band is configured as multiple separate bands positioned across the bare foil portions of the current collector for lane coating applications.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A system for manufacturing electrodes, the system comprising:

a top roll press;

a bottom roll press separated from the top roll press by a gap, the gap comprising a distance selected to accommodate a current collector, the current collector comprising a bare portion and a coated portion having thereon an active electrode material of a first thickness; and a wrinkle remover band comprising a second thickness selected, based on the first thickness, to evenly distribute stress across the bare portion and the coated portion of the current collector during a calendering process for forming a pressed electrode;

wherein the second thickness of the wrinkle remover band is tapered;

wherein the wrinkle remover band is positioned over a top surface of the bare portion of the current collector and the second thickness of the wrinkle remover band comprises a positive taper that increases towards an edge of the current collector.

2. The system of claim 1, further comprising at least one of a band guide roll and a tensioning roll configured to align the wrinkle remover band with the bare portion of the current collector.

3. The system of claim 2, further comprising a servo system coupled to at least one of the band guide roll and the tensioning roll, the servo system comprising a servo motor and one or more rollers configured to reposition the wrinkle remover band to maintain alignment with the bare portion of the current collector.

4. The system of claim 1, wherein the wrinkle remover band comprises a top wrinkle remover band positioned over a top surface of the bare portion of the current collector.

5. The system of claim 1, wherein the wrinkle remover band comprises a bottom wrinkle remover band positioned over a bottom surface of the bare portion of the current collector.

6. The system of claim 1, wherein the wrinkle remover band comprises one of a top wrinkle remover band positioned over a top surface of the bare portion of the current collector and a bottom wrinkle remover band positioned over a bottom surface of the bare portion of the current collector, and the system further comprises a second wrinkle remover band comprising the other of the top wrinkle remover band and the bottom wrinkle remover band.

7. A system for manufacturing electrodes, the system comprising:

a top roll press;

a bottom roll press separated from the top roll press by a gap, the gap comprising a distance selected to accommodate a current collector, the current collector comprising a bare portion and a coated portion having thereon an active electrode material of a first thickness; and a wrinkle remover band comprising a second thickness selected, based on the first thickness, to evenly distribute stress across the bare portion and the coated portion of the current collector during a calendering process for forming a pressed electrode;

wherein the second thickness of the wrinkle remover band is tapered;

wherein the wrinkle remover band is positioned over a bottom surface of the bare portion of the current collector and the second thickness of the wrinkle remover band comprises a positive taper that increases towards an edge of the current collector.

8. The system of claim 1, wherein the wrinkle remover band is configured as multiple separate bands positioned across the bare portion of the current collector for lane coating applications.

9. A method comprising:

providing a top roll press;

providing a bottom roll press separated from the top roll press by a gap, the gap comprising a distance selected to accommodate a current collector, the current collector comprising a bare portion and a coated portion having thereon an active electrode material of a first thickness; and providing a wrinkle remover band comprising a second thickness selected, based on the first thickness, to evenly distribute stress across the bare portion and the coated portion of the current collector during a calendering process for forming a pressed electrode;

wherein the second thickness of the wrinkle remover band is tapered;

wherein the wrinkle remover band is positioned over a top surface of the bare portion of the current collector and the second thickness of the wrinkle remover band comprises a positive taper that increases towards an edge of the current collector.

10. The method of claim 9, further comprising providing at least one of a band guide roll and a tensioning roll configured to align the wrinkle remover band with the bare portion of the current collector.

11. The method of claim 10, further comprising providing a servo system coupled to at least one of the band guide roll and the tensioning roll, the servo system comprising a servo motor and one or more rollers configured to reposition the wrinkle remover band to maintain alignment with the bare portion of the current collector.

12. The method of claim 9, wherein the wrinkle remover band comprises a top wrinkle remover band positioned over a top surface of the bare portion of the current collector.

13. The method of claim 9, wherein the wrinkle remover band comprises a bottom wrinkle remover band positioned over a bottom surface of the bare portion of the current collector.

14. The method of claim 9, wherein the wrinkle remover band comprises one of a top wrinkle remover band positioned over a top surface of the bare portion of the current collector and a bottom wrinkle remover band positioned over a bottom surface of the bare portion of the current collector, and the method further includes providing a second wrinkle remover band comprising the other of the top wrinkle remover band and the bottom wrinkle remover band.

15. The method of claim 9, wherein the wrinkle remover band is configured as multiple separate bands positioned across the bare portion of the current collector for lane coating applications.

* * * * *